US008551234B2

(12) United States Patent
Kim et al.

(10) Patent No.: US 8,551,234 B2

(45) Date of Patent: Oct. 8, 2013

(54) AIR CLEANER

(75) Inventors: Seung Ki Kim, Seoul (KR); Jun Hyung Bae, Seoul (KR)

(73) Assignee: Woongjin Coway Co., Ltd., Chungcheongnam-Do (KR)

( * ) Notice: Subject to any disclaimer, the term of this patent is extended or adjusted under 35 U.S.C. 154(b) by 610 days.

(21) Appl. No.: 12/672,543

(22) PCT Filed: Aug. 7, 2008

(86) PCT No.: PCT/KR2008/004580

§ 371 (c)(1), (2), (4) Date: Nov. 22, 2010

(87) PCT Pub. No.: WO2009/020354

PCT Pub. Date: Feb. 12, 2009

(65) Prior Publication Data

US 2011/0056380 A1 Mar. 10, 2011

(30) Foreign Application Priority Data

Aug. 8, 2007 (KR) ........................ 10-2007-0079680
Sep. 20, 2007 (KR) ........................ 10-2007-0096111

(51) Int. Cl.
*B01D 46/46* (2006.01)

(52) U.S. Cl.
USPC ............ 96/417; 55/357; 55/471; 55/DIG. 34; 74/10 R; 200/11 R; 200/564; 200/566; 200/336

(58) Field of Classification Search
USPC ................ 96/244, 417–423; 55/393, DIG. 34
See application file for complete search history.

(56) References Cited

U.S. PATENT DOCUMENTS

| | | | | |
|---|---|---|---|---|
| 2,715,946 | A * | 8/1955 | Peterson | 96/403 |
| 2,727,315 | A * | 12/1955 | Candor | 34/543 |
| 3,812,370 | A * | 5/1974 | LaViolette | 422/186.12 |
| 3,936,284 | A * | 2/1976 | Mason | 96/117.5 |

(Continued)

FOREIGN PATENT DOCUMENTS

| | | | |
|---|---|---|---|
| JP | 59-125347 | A | 7/1984 |
| KR | 20-0139303 | Y1 | 5/1999 |

(Continued)

OTHER PUBLICATIONS

Chinese Patent Office First Office Action for Chinese Patent Application No. 200880109235.7 issued May 3, 2012.

(Continued)

*Primary Examiner* — Duane Smith
*Assistant Examiner* — Joubert X Glover
(74) *Attorney, Agent, or Firm* — RatnerPrestia

(57) ABSTRACT

An air cleaner having a manipulator is disclosed. The manipulator (200) includes a rotary manipulation unit (300), which is provided so as to be movable between a first position, at which the rotary manipulation unit is retracted into the air cleaner, and a second position, to which the rotary manipulation unit is extracted from the air cleaner to enable a user to manipulate the rotary manipulation unit. The manipulator further includes a lift unit (400), which is installed in the air cleaner to move the rotary manipulation unit between the first position and the second position. In the present invention, the manipulator can control several functions of the air cleaner obviating the need for having several control buttons, thus being more convenient for a user. Furthermore, the present invention can prevent water from permeating a PCB mounted in the rotary manipulation unit, thus preventing malfunction of the encoder unit.

19 Claims, 9 Drawing Sheets

(56) References Cited

U.S. PATENT DOCUMENTS

| | | | | |
|---|---|---|---|---|
| 3,950,155 | A * | 4/1976 | Komiyama | 96/111 |
| 4,742,691 | A * | 5/1988 | Kennedy | 62/272 |
| 4,779,305 | A * | 10/1988 | Gorsek | 16/441 |
| 4,786,295 | A * | 11/1988 | Newman et al. | 96/400 |
| 5,428,964 | A * | 7/1995 | Lobdell | 62/176.6 |
| 5,641,343 | A * | 6/1997 | Frey | 96/135 |
| 5,893,939 | A * | 4/1999 | Rakocy et al. | 55/471 |
| 6,017,375 | A * | 1/2000 | Duell et al. | 55/356 |
| 6,079,401 | A * | 6/2000 | Alvord et al. | 126/39 G |
| 6,494,940 | B1 * | 12/2002 | Hak | 96/224 |
| 6,507,282 | B1 * | 1/2003 | Sherwood | 340/607 |
| 2002/0088213 | A1 * | 7/2002 | McSweeney et al. | 55/467 |
| 2002/0171336 | A1 * | 11/2002 | Moretti | 312/236 |
| 2004/0065202 | A1 * | 4/2004 | Gatchell et al. | 96/66 |
| 2005/0039305 | A1 * | 2/2005 | Chirumbolo | 16/441 |
| 2005/0144914 | A1 * | 7/2005 | Huehn et al. | 55/471 |

FOREIGN PATENT DOCUMENTS

| | | | |
|---|---|---|---|
| KR | 20 2000 0013086 | | 7/2000 |
| KR | 10-263567 | B1 | 8/2000 |
| KR | 10 2002 0003754 | A | 1/2002 |
| KR | 10 2005 0118502 | A | 12/2005 |
| KR | 10-2007-0066604 | A | 6/2007 |

OTHER PUBLICATIONS

International Search Report and Written Opinion for PCT International Application No. PCT/KR2008/004580 mailed Feb. 20, 2009.

* cited by examiner

< normal condition >

< use condition >

AIR CLEANER

This application is a U.S. National Application of PCT International Application No. PCT/KR2008/004580, filed Aug. 7, 2008.

TECHNICAL FIELD

The present invention relates, in general, to air cleaners and, more particularly, to an air cleaner which has a rotary manipulator, which is retractably extracted from the outer surface of the air cleaner and is able to prevent water from being undesirably drawn therethrough and into the air cleaner.

BACKGROUND OF THE INVENTION

As is well known to those skilled in the art, air cleaners are apparatuses which purify polluted air to change it into clean air. Typically, an air cleaner is installed in a room having a predetermined volume and functions to remove pollution substances and harmful bacteria from the air in the room and thus provide clean air.

According to the purification method used, such air cleaners are classified into filter type air cleaners, electrostatic precipitation air cleaners and anion generating air cleaners. The filter type air cleaners typically include several filters, such as a free filter (or a medium filter) for removing large particles, a HEPA filter for removing fine particles, and an active carbon filter for removing noxious gas and odor. Recently, in particular, water filters which remove pollution, such as dust or particulates, using the absorptive force of water, are also widely used. The electrostatic precipitation air cleaners collect dust and remove odors using a high voltage. The electrostatic precipitation air cleaners can effectively remove fine particles of dust as well as large particles of dust, thus creating a superior air cleaning effect. However, after a predetermined amount of dust is collected, dust may become undesirably separated from a dust collection plate. Therefore, the dust collection plate must be frequently cleaned and maintained. The anion generating air cleaners make use of the property of anions to bond noxious substances floating in the air.

Meanwhile, according to the installed orientation, air cleaners are classified into stand type air cleaners and table type air cleaners. The stand type air cleaners are placed upright on the ground. The table type air cleaners are horizontally placed on the ground such that covers disposed on the upper surfaces of the air cleaners can be used as tables.

FIG. 1 is a view showing the external shape of a typical air cleaner. As shown in FIG. 1, the conventional air cleaner 1 includes a casing 2, which has a predetermined shape (typically, a rectangular parallelepiped shape). An inlet port 3 and an outlet port 4 are formed in the casing 2.

Furthermore, a fan (not shown) is typically installed in the casing 2 of the air cleaner 1. Air in a room is drawn into the casing 2 through the inlet port 3 by the operation of the fan (not shown). Thereafter, noxious substances are removed from air using one of the above-mentioned air cleaning methods. Cleaned air is subsequently discharged from the air cleaner 1 through the outlet port 4.

A manipulator 5 is provided on the casing 2 of the air cleaner 1 to manipulate and control the operation of the air cleaner 1.

In detail, the operations of turning on/off the air cleaner 1, cleaning intensity, cleaning operation duration, an air discharge direction, or a cleaning mode such as a sandy dust removing mode, a dehumidifying mode, a humidifying mode, are controlled using the manipulator 5.

However, the manipulator 5 of the conventional air cleaner 1 includes control buttons 6. To control the several functions of the air cleaner 1, the several control buttons 6 corresponding to the number of functions of the air cleaner 1 is required.

In particular, recently, as well as having the basic air cleaning function, the air cleaners are manufactured with a tendency to be able to conduct various air cleaning functions depending on conditions in rooms. Therefore, in response to this, the number of control buttons 6 must concomitantly be increased. In this case, the manipulator 5 occupies a relatively large area of the outer surface of the air cleaner 1, thus deteriorating the external appearance of the air cleaner 1.

In addition, when it is desired for a user to control the functions of the air cleaner 1, the user must check all control buttons 6 corresponding to the respective functions and thereafter push the desired button or buttons.

Moreover, with regard to an air cleaner which has an encoder unit and is convertible between a table type and a stand type, in the case where the air cleaner is used in the table type manner, the encoder unit may inconvenience the user, because the encoder unit protrudes from the outer surface of the air cleaner to allow the user to hold and rotate the encoder unit. As well, there is a problem in that water may enter the encoder unit, with the result that a printed circuit board (hereinafter, referred to in common as 'PCB') of the encoder unit is damaged by water. That is, in the case where the air cleaner is used in the table type manner, the cover provided on the upper surface of the air cleaner forms the upper surface of the table. Because the encoder unit is typically provided in the cover that forms the upper surface of the table, water may permeate the encoder unit. As a result, the PCB of the encoder unit may be damaged.

SUMMARY OF THE INVENTION

Accordingly, the present invention has been made keeping in mind the above problems occurring in the prior art, and an aspect of the present invention is to provide an air cleaner which has a rotary manipulator in place of the conventional button type manipulators, thus improving the external appearance of the air cleaner, and facilitating the manipulation of the manipulator, wherein water is prevented from being drawn into the air cleaner through the rotary manipulator by virtue of its construction.

In an aspect, the present invention provides an air cleaner having a manipulator, wherein the manipulator includes: a rotary manipulation unit provided so as to be movable between a first position, at which the rotary manipulation unit is retracted into a casing of the air cleaner, and a second position, at which the rotary manipulation unit is extracted from the casing of the air cleaner to enable a user to manipulate the rotary manipulation unit, wherein when the rotary manipulation unit is disposed at the second position, the rotary manipulation unit is allowed to be rotated by the manipulation of the user to control operation of the air cleaner; and a lift unit supportably installed in the air cleaner to move the rotary manipulation unit between the first position and the second position.

The rotary manipulation unit may include: a handle, having a knob and an extension part extending from a lower end of the knob in a circumferential direction; an upper cover for supporting the extension part of the handle to prevent the handle from being removed from a correct position thereof; a lower cover for covering a lower surface of the upper cover; and a control signal generator mounted to the lower cover to generate various control signals corresponding to the rotation of the handle for controlling the air cleaner.

The control signal generator may include: an encoder mounted to a PCB and connected to a rotating center of the handle to generate different control signals depending on angles at which the handle is rotated to; and at least one luminous unit to generate various colors of light.

The extension part of the handle may include: a first extension extending outwards from an outer surface of the knob in a horizontal direction; and a second extension extending from an outer edge of the first extension in a vertical direction, wherein the second extension may be inserted between the upper cover and an annular protrusion part, which protrudes from a perimeter of the lower cover in a vertical direction.

The lower cover may include: a first support part, on which the control signal generator is seated; the annular protrusion part protruding upright from an outer edge of the first support part; a second support part extending outwards from an outer lower end of the annular protrusion part on a level plane with the first support part; and a third support part extending upright from an outer edge of the second support part, wherein the second extension of the extension part and an outer edge of the upper cover may be inserted between the annular protrusion part and the third support part and are seated onto the second support part.

Furthermore, a drain hole for draining water may be formed through the second support part.

The knob of the handle may include a first knob housing extending a predetermined length in a vertical direction, the first knob housing having a cylindrical shape; a second knob housing provided inside the first knob housing at a position spaced apart from the first knob housing by a predetermined distance, the second knob housing vertically extending a length shorter than the length of the first knob housing; and a third knob housing extending downwards from a lower end of the second knob housing towards a center of the control signal generator at a predetermined inclination angle.

The third knob housing may reflect light, emitted from the luminous unit provided in the control signal generator, and transmit the light to outside the handle.

In addition, a click protrusion may be provided on an inner surface of the upper cover, and a click dial may be formed on an outer surface of the extension part, the click dial engaging with the click protrusion.

As well, when the user pushes the rotary manipulation unit in a direction from the second position to the first position, the lift unit may move the rotary manipulation unit from the second position to the first position or from the first position to the second position using a cam mechanism.

The lift unit may include: an actuating bar coupled at a first end thereof to the rotary manipulation unit, with a cam guide protruding from one surface of the actuating bar; an elastic member coupled to a second end of the actuating bar; a cam shaft seated into the cam guide, the cam shaft being movable in a lateral direction; and a cam housing having a guide slot for receiving the cam shaft, the cam housing supporting the actuating bar and the elastic member therein, such that the actuating bar is movable upwards or downwards.

In another aspect, the present invention provides an air cleaner having a manipulator, wherein the manipulator comprises a rotary manipulation unit for controlling operation of the air cleaner by rotation thereof.

The rotary manipulation unit may include: a handle, having a knob and an extension part extending from a lower end of the knob in a circumferential direction; an upper cover for supporting the extension part of the handle to prevent the handle from being removed from a correct position thereof; a lower cover for covering a lower surface of the upper cover; and a control signal generator mounted to the lower cover to generate various control signals corresponding to the rotation of the handle for controlling the air cleaner.

The control signal generator may include: an encoder mounted to a PCB and connected to a rotating center of the handle to generate different control signals depending on angles at which the handle is rotated to; and at least one luminous unit to generate various colors of light.

The extension part of the handle may include: a first extension extending outwards from an outer surface of the knob in a horizontal direction; and a second extension extending from an outer edge of the first extension in a vertical direction, wherein the second extension may be inserted between the upper cover and an annular protrusion part, which protrudes from a perimeter of the lower cover in a vertical direction.

The lower cover may include: a first support part, on which the control signal generator is seated; the annular protrusion part protruding upright from an outer edge of the first support part; a second support part extending outwards from an outer lower end of the annular protrusion part on a level plane with the first support part; and a third support part extending upright from an outer edge of the second support part, wherein the second extension of the extension part and an outer edge of the upper cover may be inserted between the annular protrusion part and the third support part and are seated onto the second support part.

Furthermore, a drain hole for draining water may be formed through the second support part.

The knob of the handle may include: a first knob housing extending a predetermined length in a vertical direction, the first knob housing having a cylindrical shape; a second knob housing provided inside the first knob housing at a position spaced apart from the first knob housing by a predetermined distance, the second knob housing vertically extending a length shorter than the length of the first knob housing; and a third knob housing extending downwards from a lower end of the second knob housing towards a center of the control signal generator at a predetermined inclination angle.

The third knob housing may reflect light, emitted from the luminous unit provided in the control signal generator, and transmit the light to outside the handle.

In addition, a click protrusion may be provided on an inner surface of the upper cover, and a click dial may be formed on an outer surface of the extension part, the click dial engaging with the click protrusion.

In an air cleaner according to the present invention, a manipulator comprises a rotary encoder unit, which controls several functions of the air cleaner and which obviates the need for having several control buttons, thus being more convenient for a user.

Furthermore, because the single rotary manipulator is used in place of several control buttons, the present invention can solve the conventional problem in that the manipulator occupies a large area of the outer surface of the air cleaner. In addition, the present invention is constructed such that the encoder unit can be retracted into the air cleaner. Thus, after the use of the air cleaner (or the setting of the manipulator) is completed, the encoder unit is retracted into the air cleaner, thus improving the external appearance of the air cleaner.

Moreover, in the present invention, the structure of a handle of the manipulator and a lower cover is improved, so that water is prevented from permeating a PCB mounted in the lower cover. Thus, the encoder unit is prevented from malfunctioning due to water.

DETAILED DESCRIPTION OF THE INVENTION

Hereinafter, an air cleaner according to a preferred embodiment of the present invention will be described in detail with reference to the attached drawings. The embodiment of the present invention pertains to only a manipulator for controlling the operation of the air cleaner, therefore detailed explanation of the method and the principle of air cleaning will be skipped.

Figure 1:
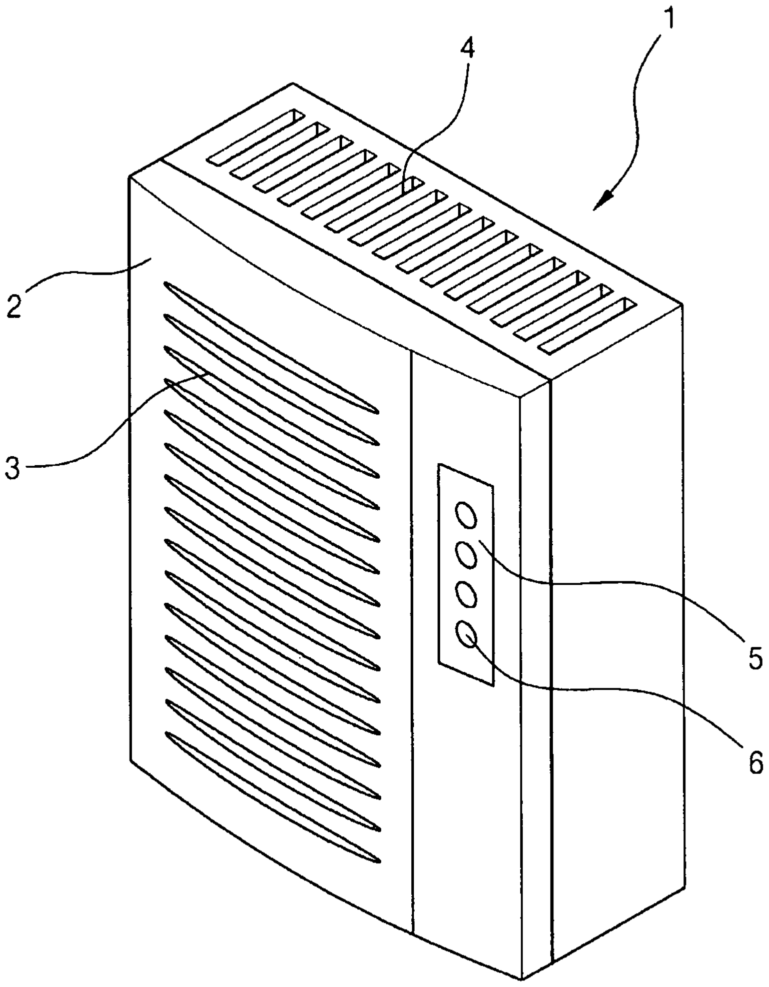
FIG. 1 is a view showing the external shape of a conventional air cleaner.
Figure 2:
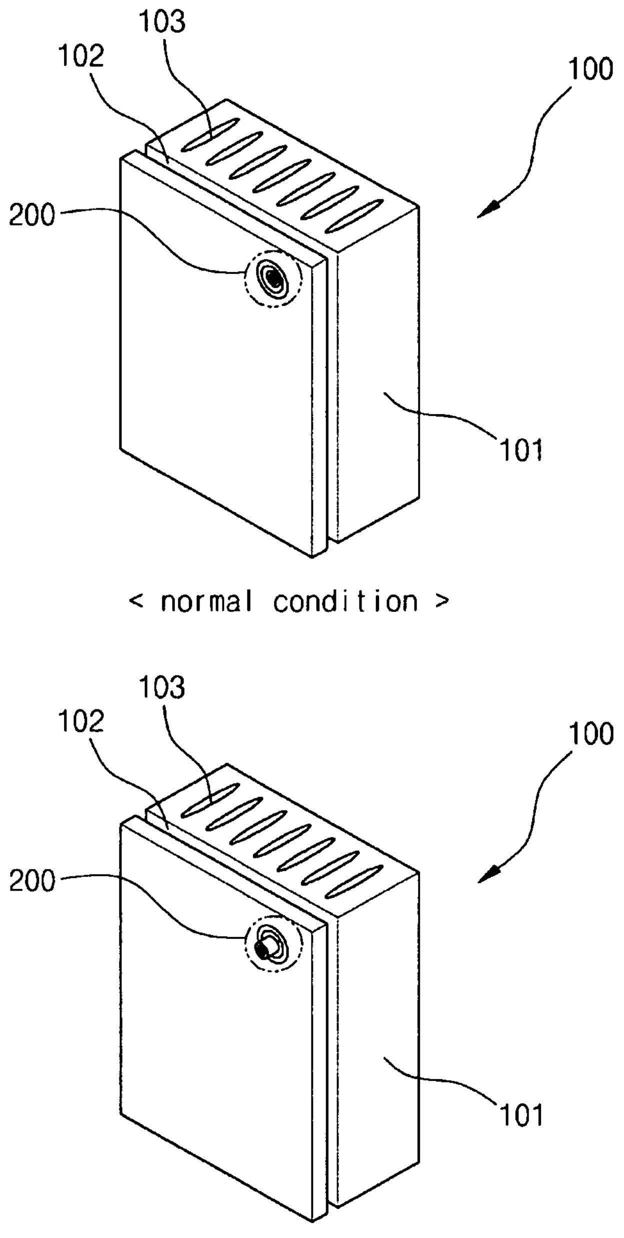
FIG. 2 is of views showing the external shape of an air cleaner, according to an embodiment of the present invention.
Figure 3:
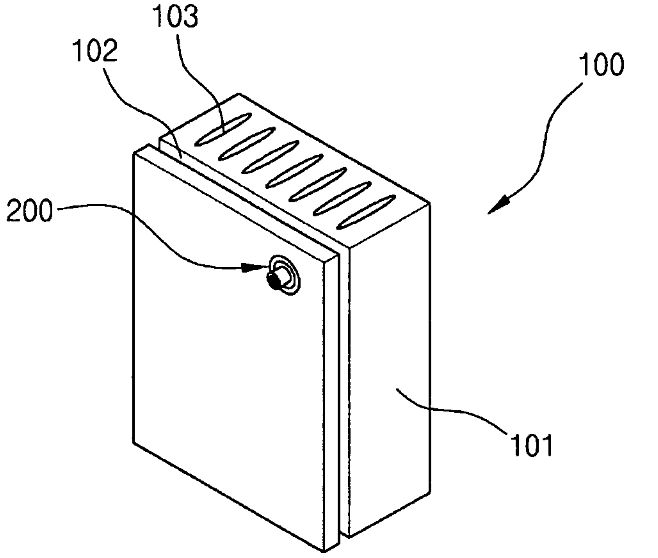
FIGS. 3 and 4 are views showing the external shapes of air cleaners according to the embodiment of the present invention.
Figure 4:
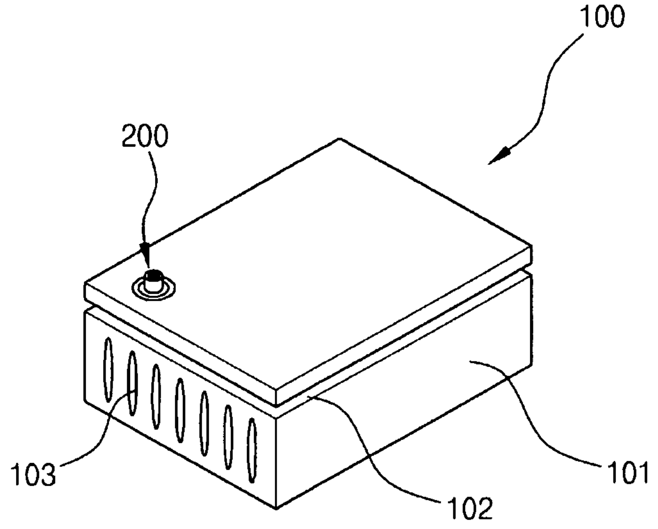

FIG. 2 is of views showing the external shape of an air cleaner, according to an embodiment of the present invention. FIGS. 3 and 4 are views showing the external shapes of air cleaners according to the present invention, in which FIG. 3 illustrates a stand type air cleaner, and FIG. 4 illustrates a table type air cleaner.

As shown in FIGS. 2 through 4, the air cleaner 100 has an inlet port 102, through which air is drawn into the air cleaner 100, and an outlet port 103, through which purified air is discharged to the outside of the air cleaner 100.

The inlet port 102 is formed in the front surface of the air cleaner 100, and the outlet port 103 is formed in the upper surface of the air cleaner 100. However, the location of the inlet port 102 or the outlet port 103 is not limited to the above-mentioned positions. According to the intended purposes, for example, according to whether the air cleaner 100 is a stand type or a table type, the location of the inlet port 102 or the outlet port 103 may be varied.

The air cleaner 100 includes a manipulator 200. It is preferable that the manipulator 200 be an encoder unit, which is rotatable relative to the air cleaner 100 and is retractably extracted from the air cleaner 100.

The manipulator 200 enables a user to control the operation of the air cleaner 100 according to his/her the desired intensions. Preferably, the manipulator 200 has a rotatable structure, such that the operation and functions of the air cleaner 100 are controlled depending on the rotation of the manipulator 200.

Here, the manipulator 200 can be set such that various operation and functions of the air cleaner 100 are controlled by the manipulator 200. For example, the operation of turning on/off the air cleaner 100, cleaning intensity, cleaning duration, air discharge direction, or a cleaning mode such as a sandy dust removing mode, a dehumidifying mode, a humidifying mode, may be controlled by the manipulator 200.

In this specification, the term "controlling the operation of the air cleaner" means that various operations and functions of the air cleaner are controlled.

Furthermore, the manipulator 200 is constructed such that it can be extracted from the outer surface of the air cleaner 100 so as to be retractable back into the air cleaner 100.

In detail, under normal conditions, the manipulator 200 is in a state of being disposed inside a casing 101 of the air cleaner 100. In this state, when the user pushes the manipulator 200 once to control the operation and functions of the air cleaner 100, which has been in the retracted state, the manipulator 200 is extracted from the casing 101 of the air cleaner 100 to a predetermined distance, thus entering a state in which the user can rotate the manipulator 200 to control the air cleaner 100. When the user again pushes the manipulator 200, which has been extracted from the casing 101 of the air cleaner 100, the manipulator 200 is returned to its original retracted state.

Here, the term "retraction of the manipulator 200 into the casing 101 of the air cleaner 100" means that the manipulator 200 is inserted into the surface of the casing 101 to a predetermined depth such that one surface of the manipulator 200 is flush with the outer surface of the casing 101. However, the present invention is not limited to this.

Figure 5:
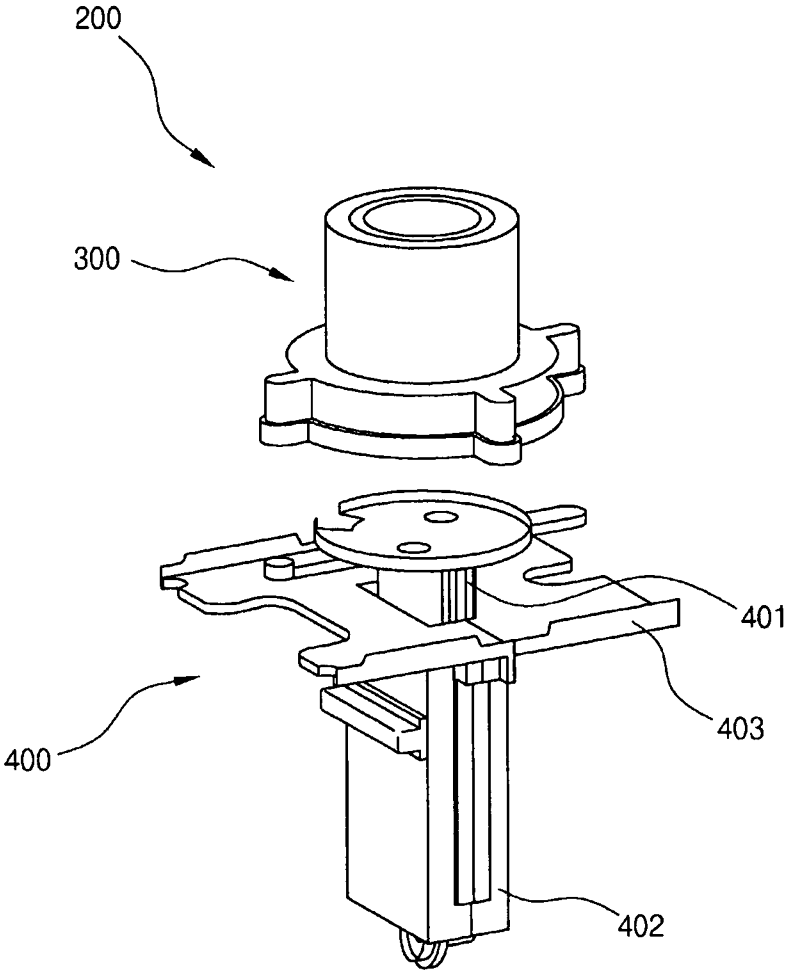
FIG. 5 is a view showing the construction of a manipulator of the air cleaner according to the present invention.
Figure 6:
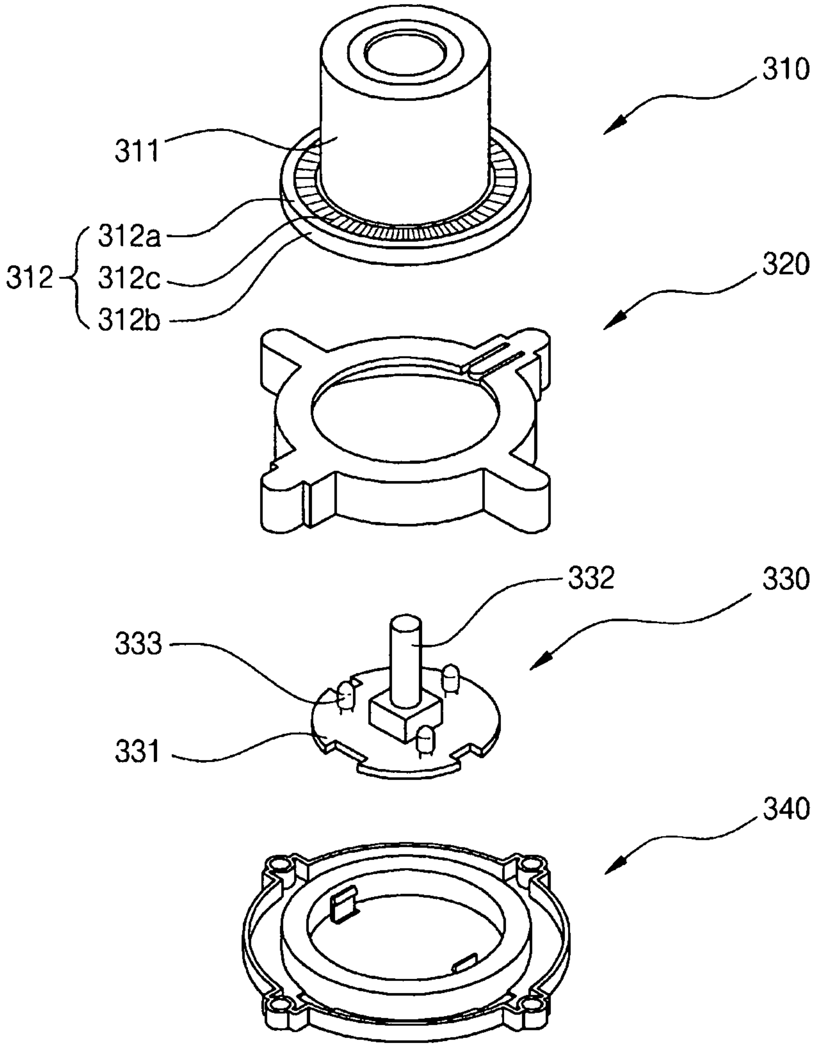
FIG. 6 is an exploded perspective view of a rotary manipulation unit of FIG. 5.
Figure 7:
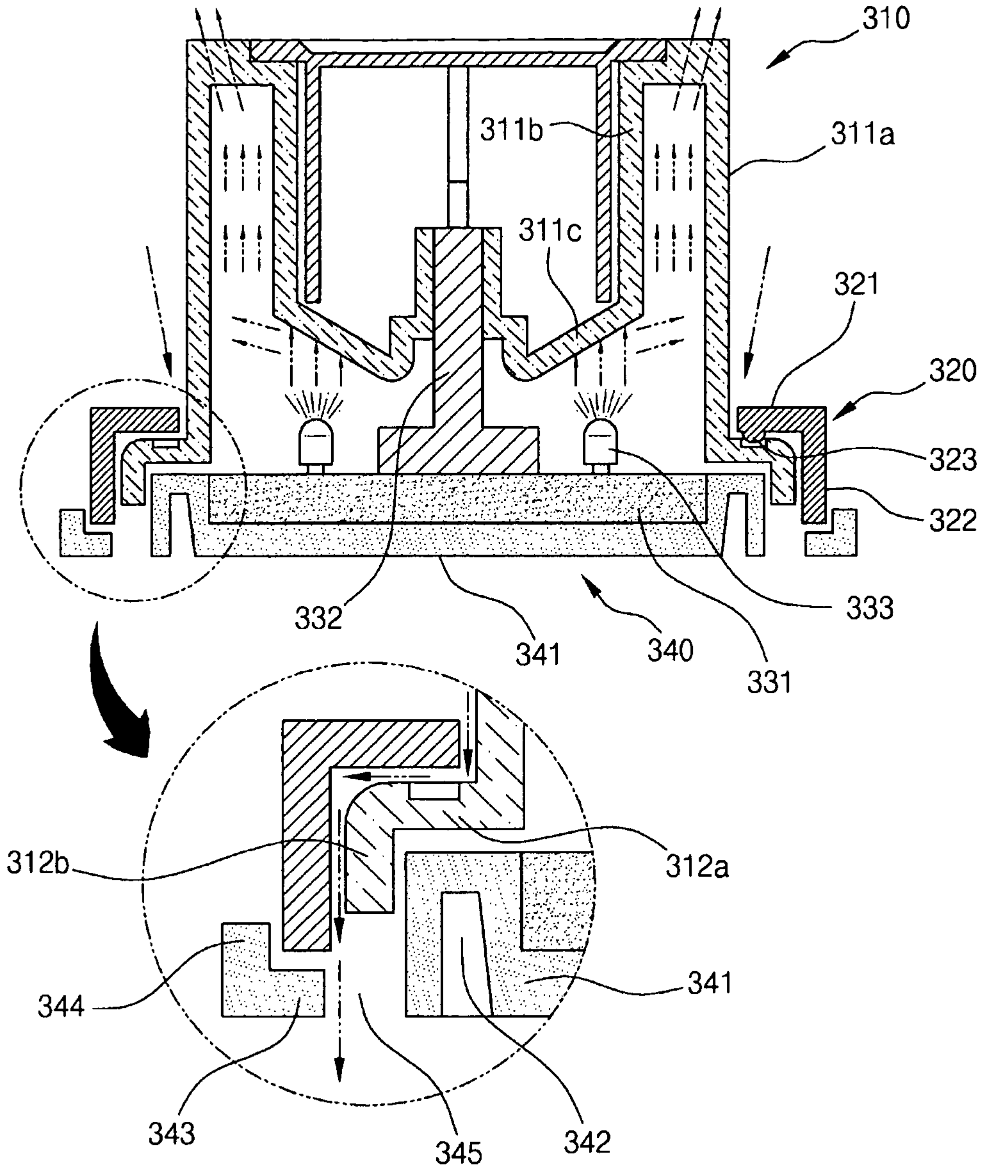
FIG. 7 is a sectional view of the rotary manipulation unit of FIG. 6.
Figure 8:
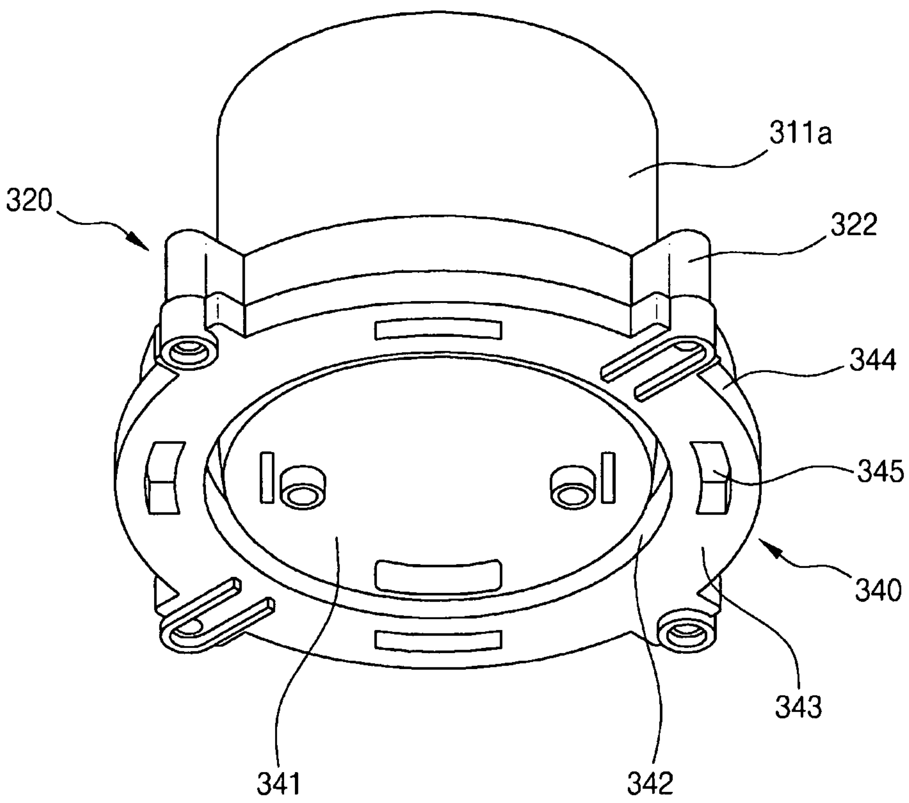
FIG. 8 is a bottom perspective view of the assembled rotary manipulation unit having the elements of FIG. 7.
Figure 9:
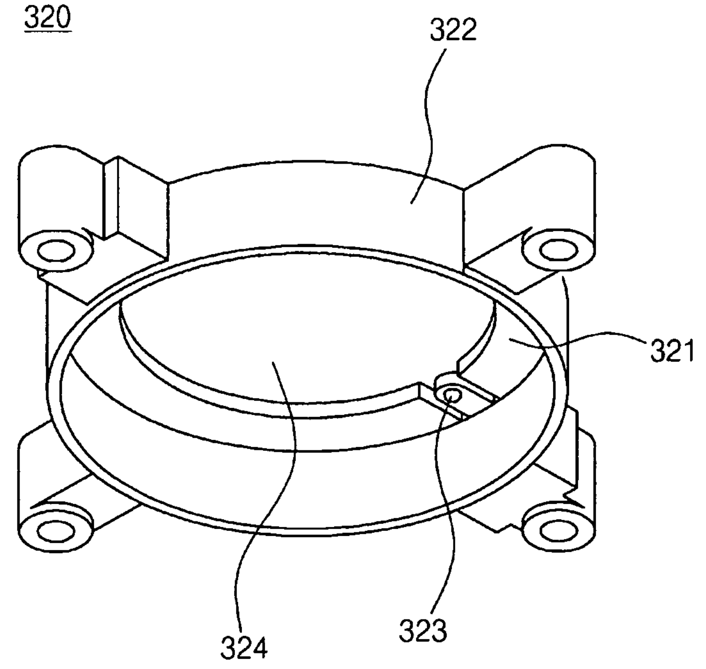
FIG. 9 is a view showing an inner surface of an upper cover of FIG. 8.

FIG. 5 is a view showing the construction of the manipulator according to the present invention. FIG. 6 is an exploded perspective view of a rotary manipulation unit of FIG. 5. FIG. 7 is a sectional view of the rotary manipulation unit of FIG. 6. FIG. 8 is a bottom perspective view of the assembled rotary manipulation unit having the elements of FIG. 7. FIG. 9 is a view showing an inner surface of an upper cover of FIG. 8.

The manipulator 200 will be explained in more detail with reference to FIGS. 5 through 9.

As shown in FIG. 5, the manipulator 200 includes the rotary manipulation unit 300 and a lift unit 400.

The rotary manipulation unit 300 serves to control the operation of the air cleaner (100, refer to FIG. 2) and has a rotatable structure. The rotary manipulation unit 300 is constructed such that it is extracted from the casing (101, refer to FIG. 2) of the air cleaner 100 so as to be retractable into the casing 101.

In other words, the rotary manipulation unit 300 is moved between a first position, at which the rotary manipulation unit 300 is in a state of being retracted into the casing 101 of the air cleaner 100, and a second position, at which the rotary manipulation unit 300 is in a state of being extracted from the casing 101 to allow the user to manipulate the rotary manipulation unit 300. Preferably, the first position to which the rotary manipulation unit 300 is retracted into the casing 101 of the air cleaner 100 is a position such that an upper surface of a knob 311 of the rotary manipulation unit 300 is flush with the outer surface of the casing 101 of the air cleaner 100. Furthermore, it is preferable that the second position be a position at which the upper surface of the knob 311 is protruded from (or is exposed from) the outer surface of the casing 101 of the air cleaner 100 by a predetermined distance to allow the user to hold the rotary manipulation unit 300 and rotate it.

Figure 11:
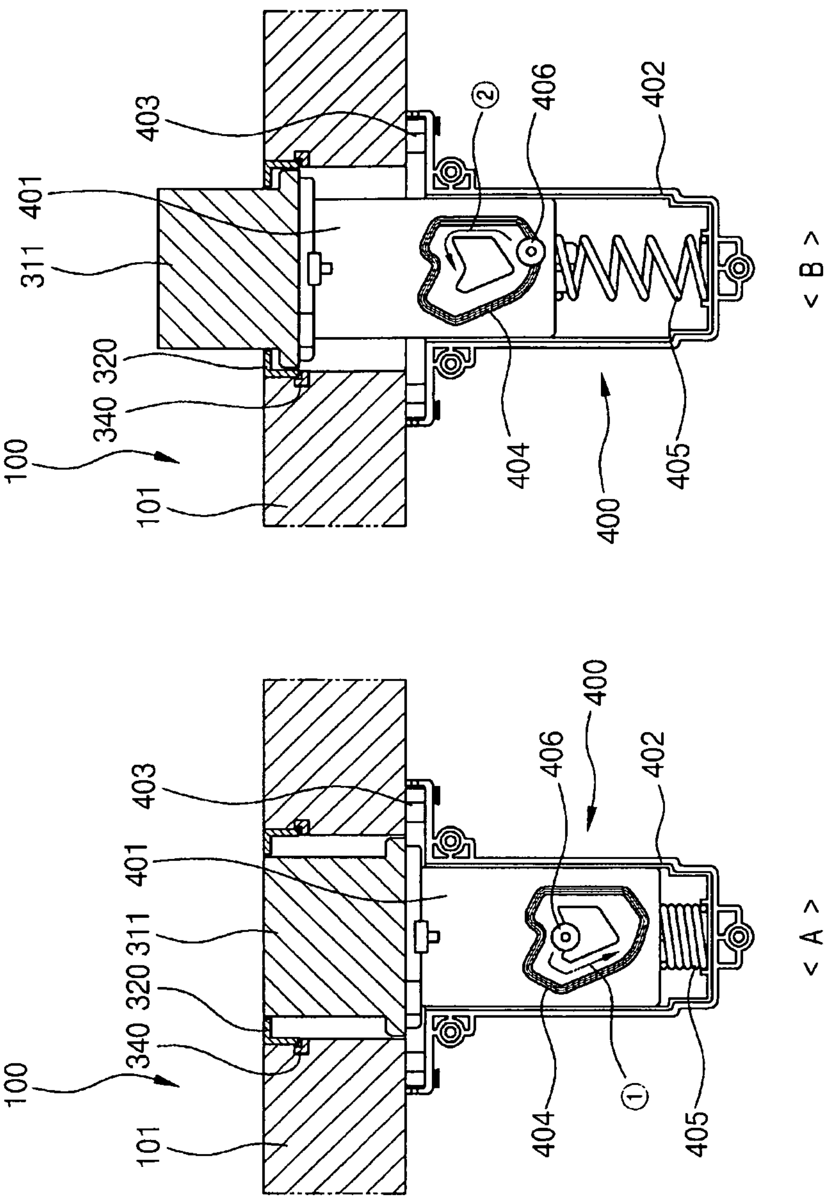
FIG. 11 is of partial sectional views illustrating the operation principle of the manipulator of the air cleaner according to the embodiment of the present invention.

The lift unit 400 includes a mounting plate 403 and is supported in the air cleaner 100 by fastening the mounting plate 403 to the inner surface of the casing (101, refer to FIGS. 3, 4 and 11). An actuating bar 401 is provided in a housing 402 of the lift unit 400 so as to be movable upwards or downwards. The actuating bar 401 is coupled to the rotary manipulation unit 300, thus moving the rotary manipulation unit 300 between the first position and the second position.

As stated above, the manipulator 200 of the present invention functions to control the air cleaner 100 and has the rotatable structure. Furthermore, the manipulator 200 is extracted into the casing 101 of the air cleaner 100 so as to be retractable into the casing 101.

Referring to FIGS. 5 through 9, the rotary manipulation unit 300 of the manipulator 200 which conducts the above-mentioned functions and operation includes a handle 310, which enables the user to hold and rotate it. The handle 310 includes the knob 311, which has a cylindrical shape, and an extension part 312, which extends from the circumferential outer surface of the lower end of the knob 311 in a circumferential direction. The rotary manipulation unit 300 further includes an upper cover 320, into which the extension part 312 is inserted to be prevented from being undesirably removed from the upper cover 320, a lower cover 340 which covers the lower end of the upper cover, and a control signal generator 330 which is mounted to the lower cover 340. The control signal generator 330 generates various control signals for controlling the air cleaner depending on the rotation of the handle 310 and transmits the signals to a control unit (not shown) of the air cleaner.

It is preferable that the knob 311 of the handle 310 have a cylindrical shape and thus ensure convenience of manipulation. However, in consideration of improvement in the external appearance of the air cleaner 100, the knob 311 may have a polygonal cross-section. The knob 311 includes a first knob housing 311*a*, which vertically extends a predetermined length, and a second knob housing 311*b*, which is provided inside the first knob housing 311*a* at a position spaced apart from the first knob housing 311*a* by a predetermined distance. The second knob housing 311*b* vertically extends a length shorter than that of the first knob housing 311*a*. The knob 311 further includes a third knob housing 311*c*, which extends downwards from the lower end of the second knob housing 311*b* towards the center of the control signal generator 330 at a predetermined inclination angle. The extension part 312 of the handle 310 includes a first extension 312*a*, which horizontally extends outwards from the outer surface of the first knob housing 311*a*, and a second extension 312*b*, which vertically extends from the outer edge of the first extension 312*a*.

The upper cover 320 has a shape appropriate to cover the extension part 312 of the handle. The upper cover 320 is coupled to the lower cover 340. The upper cover 320 includes a horizontal part 321, which horizontally extends, and a vertical part 322, which is bent from the edge of the horizontal part 321 in the vertical direction. An insert hole 324 is formed through the central portion of the horizontal part 321. The knob 311 passes through the insert hole 324.

The control signal generator 330 includes an encoder 332, which is mounted to a PCB 331, and at least one luminous unit, which emits various colors of light, and is preferably a light emitting diode 333 (hereinafter, referred to as 'LED'). Of course, another type of light emitting unit may be used as the luminous unit.

The encoder 332 functions to transmit input signals, generated depending to the rotation of the handle, to the PCB 331, thus generating control signals. The encoder 332 is connected at the lower end thereof to the PCB 331. The upper end of the encoder 332 has a cylindrical rotating shaft structure and thus is coupled to the rotational center of the handle 310. The control signal generator 330 generates predetermined control signals depending on an angle, at which the handle is rotated, and thus controls the operation of the air cleaner 100. In this embodiment, several LEDs 333 are provided on the PCB 331 to indicate the state of operation of the air cleaner 100. Therefore, when various control signals are input depending on the rotation of the handle, the PCB 331 operates the LED or LEDs 333 corresponding to the input control signals such that the LED or LEDs 333 emit light. Here, the LEDs 333 have different colors, so that the control signals can be distinguished.

The control signal generator 330 is mounted to the central portion of the lower cover 340. The lower cover 340 is coupled to the upper cover 320. The handle 310 and the control signal generator 330 are supported by the lower cover 340 and the upper cover 320, which are coupled to each other.

Three characteristics of the manipulator 200 according to the present invention having the above-mentioned construction will now be discussed.

A first characteristic of the manipulator 200 according to the present invention is that even if the air cleaner is placed in the horizontal direction but not placed in the vertical direction, that is, even if the manipulator 200 is oriented in the horizontal direction, the PCB can be prevented from being damaged by water seepage. That is, the manipulator 200 is characterized in that the PCB 331 can be insulated from the outside by the extension part 312 of the handle 310 and the lower cover 340.

To achieve the above-mentioned purpose, the extension part 312 has the first extension 312*a*, which horizontally extends outwards from the outer surface of the first knob housing 311*a* of the handle, and the second extension 312*b*, which vertically extends from the outer edge of the first extension 312*a*.

Furthermore, the lower cover 340 includes a first support part 341, onto which the control signal generator 330 is seated, and an annular protrusion part 342, which protrudes upright from the outer edge of the first support part 341. The lower cover 340 further includes a second support part 343, which extends outwards from the outer lower end of the annular protrusion part 342 on a level plane with the first support part 341, and a third support part 344, which extends upright from the outer edge of the second support part 343. The second extension 321*b* of the extension part and the vertical part 322 of the upper cover are inserted between the annular protrusion part 342 and the third support part 344 and are thus disposed on the second support part 343. In addition, a drain hole 345 is formed through the second support part 343. Thus, water, which flows on the outer surfaces of the first knob housing 311*a*, the first extension 312*a* and the second extension 312*b*, is discharged to the outside the manipulator.

A second characteristic of the manipulator 200 according to the present invention is that light generated from the LEDs of the control signal generator 330 is emitted to the outside through the handle 310, allowing for improvements in the external appearance of the air cleaner and indicating the state of operation of the air cleaner.

To achieve the above purpose, the third knob housing 311*c*, which is provided inside the handle 310, is inclined downwards towards the center or the control signal generator 330, as stated above.

In detail, the control signal generator 330 is placed below the third knob housing 311*c*. Light emitted from the LEDs 333 of the control signal generator 330 is reflected by the third knob housing 311*c* and is thus dispersed towards the entire area of the outer surface of the handle. The dispersed light is transmitted to the outside of the handle through various light transmission paths. That is, as shown in FIG. 7, light may be emitted to outside the handle via space between the first knob housing 311*a* and the second knob housing 311*b*. Some light may be emitted to outside the handle through other light transmission space.

In further detail, the third knob housing 311*c* functions to disperse light in various directions emitted from the LEDs. Furthermore, it is preferable that the first through third knob housings and the other elements provided in the handle be coated with material having relatively high reflectability. With regard to the handle, a portion, which connects the first knob housing 311*a* and the second knob housing 311*b* to each other, or other portions, through which light is transmitted to the outside of the handle, are preferably made of transparent material.

A third characteristic of the manipulator 200 according to the present invention is that it is constructed such that the user can feel a clicking vibration when rotating the handle 310.

To achieve this purpose, a click protrusion 323 is provided on the inner surface of the horizontal part 321 of the upper cover 320. A click dial 312*c*, which contacts the click protrusion 323 to provide a clicking vibration, is formed on the outer surface of the first extension 321*a* of the handle.

Of course, the encoder 332 itself has a structure for providing a clicking vibration when rotating. However, because the handle 310 has a diameter larger than that of the rotating shaft of the encoder 332, when the user holds and rotates the handle 310, the clicking vibration may deteriorate. To prevent this, the present invention has the additional click protrusion 323 and click dial 312*c*, thus improving the clicking vibration.

Here, the number of graduations on the click dial 321*c* or the interval between graduations can be set depending on the number of kinds of operations or functions of the air cleaner that is indicated by the manipulator 200.

Furthermore, the click protrusion 323 may be provided on the inner surface of the vertical part 322. In this case, the click dial 312*c* is preferably provided on the outer surface of the second extension 312*b*.

Figure 10:
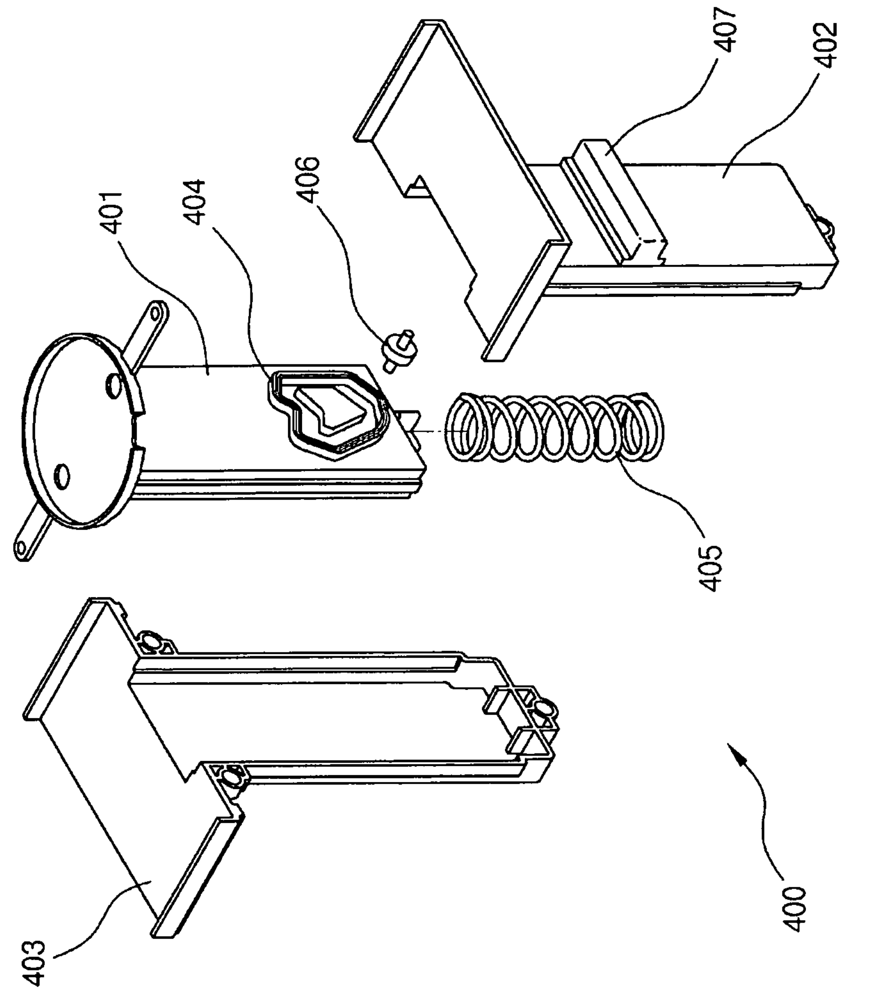
FIG. 10 is an exploded perspective view of a lift unit according to the embodiment of the present invention.

FIG. 10 is an exploded perspective view of the lift unit according to the embodiment of the present invention. FIG. 11 is partial sectional view illustrating the operating principle of the manipulator of the air cleaner according to the embodiment of the present invention.

The lift unit 400 will be explained with reference to FIG. 10. The lift unit 400 includes an actuating bar 401, a coupling plate 403, an elastic member 405, a cam shaft 406 and a cam housing 402, containing these elements therein. The actuating bar 401 is provided in the cam housing 402 so as to be movable upwards or downwards. Here, the term "upwards or downwards" means a direction, in which the rotary manipulation unit (300, refer to FIG. 6) is extracted from or retracted into the casing of the air cleaner. Therefore, the rotary manipulation unit 300 is coupled to a first end of the actuating bar 401. The actuating bar 401 is moved in the cam housing 402 using cam mechanism. For this, a cam guide 404 which guides a cam shaft 406 protrudes from one surface of the actuating bar 401.

The elastic member 405 is coupled to a second end of the actuating bar 401. A typical spring may be used as the elastic member 405. The elastic member 405 provides elastic force to the rotary manipulation unit 300 such that the rotary manipulation unit 300 is biased to the outside of the casing 101 of the air cleaner 100.

The cam housing 402 contains the actuating bar 401, the elastic member 405 and the cam shaft 406 therein. A guide slot 407 is formed in one surface of the cam housing 402, so that the cam shaft 406 is movable in the lateral direction along the guide slot 407.

The operative principle of the manipulator according to the embodiment of the present invention will be explained with reference to FIGS. 10 and 11.

As shown in FIG. 11, when the user pushes the knob 311 of the rotary manipulation unit 300, the lift unit 400 moves the rotary manipulation unit 300 from the state A to the state B or from the state B to the state A using the cam mechanism. Here, the term "pushing the rotary manipulation unit 300" means that the user pushes the rotary manipulation unit 300 downwards once and then releases it, so that a predetermined pressure is applied for a predetermined time to the rotary manipulation unit 300 before being released.

In the state A, the rotary manipulation unit 300 is disposed at a first position. The state A indicates a normal condition operating state in which the user does not use the rotary manipulation unit 300. In that state, the elastic member 405 is in a state of having been compressed by the downward movement of the actuating bar 401. The cam shaft 406 is in a state of having been seated into an upper depression of the cam guide 404, so that the actuating bar 401 maintains the state of having been moved downwards.

From the state A, when the user pushes the knob 311 of the rotary manipulation unit 300, downward force is applied to the actuating bar 401 for a predetermined time, so that the actuating bar 401 is further moved downwards by the downward force and thus further compresses the elastic member 405. At this time, because the cam shaft 406, which has been seated in the upper depression of the cam guide 404, is movable only in the lateral direction (due to the guide slot 407, refer to FIG. 10), the cam shaft 406 is moved to the left by a corresponding protrusion of the cam guide 404, as the actuating bar 401 is moved downwards. Thereafter, when the downward force is removed, the actuating bar 401 is moved upwards by the elastic force of the elastic member 405. The cam shaft 406 is moved in the direction ① by the upward movement of the actuating bar 401 and then is seated into a lower depression of the cam guide 404. Thus, the rotary manipulation unit 300 is extracted outwards from the casing 101 of the air cleaner 100. As a result, the rotary manipulation unit 300 enters the state B and, in other words, is disposed at the second position to allow the user to hold and rotate the rotary manipulation unit 300.

In the state B, when the user pushes the knob 311 of the rotary manipulation unit 300 downwards again, downward force is applied to the actuating bar 401 for a predetermined time. The actuating bar 401 is moved downwards by the downward force and thus compresses the elastic member 405. The cam shaft 405, which has been seated in the lower depression of the cam guide 404, is moved in the direction ② by a corresponding protrusion of the cam guide 404, as the actuating bar 401 is moved downwards. Thereafter, when the downward force is removed, the cam shaft 405 is seated into the upper depression of the cam guide 404 and enters into the state A.

Although the preferred embodiment of the present invention has been disclosed for illustrative purposes, the present invention is not limited to the embodiment. Furthermore, those skilled in the art will appreciate that various modifications, additions and substitutions are possible, without departing from the scope and spirit of the invention as disclosed in the accompanying claims. Therefore, these modifications, additions and substitutions must be regarded as falling within the bounds of the present invention.

The invention claimed is:

1. An air cleaner having a manipulator, wherein the manipulator comprises:

a rotary manipulation unit provided so as to be movable between a first position, at which the rotary manipulation unit is retracted into a casing of the air cleaner, and a second position, at which the rotary manipulation unit is extracted from the casing of the air cleaner to enable a user to manipulate the rotary manipulation unit, wherein when the rotary manipulation unit is disposed at the second position, the rotary manipulation unit is allowed to be rotated by the manipulation of the user to control operation of the air cleaner; and a lift unit supportably installed in the air cleaner to move the rotary manipulation unit between the first position and the second position, wherein the rotary manipulation unit comprises:

a handle which is installed rotatably and an encoder mounted to a PCB and connected to a rotating center of the handle to generate different control signals depending on angles at which the handle is rotated to.

2. The air cleaner according to claim 1, wherein the rotary manipulation unit comprises:

a handle, having a knob and an extension part extending from a lower end of the knob in a circumferential direction;

an upper cover for supporting the extension part of the handle to prevent the handle from being removed from a correct position thereof;

a lower cover for covering a lower surface of the upper cover; and a control signal generator mounted to the lower cover to generate various control signals corresponding to the rotation of the handle for controlling the air cleaner.

3. The air cleaner according to claim 2, wherein the control signal generator comprises:

at least one luminous unit to generate various colors of light.

4. The air cleaner according to claim 2, wherein the extension part of the handle comprises:

a first extension extending outwards from an outer surface of the knob in a horizontal direction; and a second extension extending from an outer edge of the first extension in a vertical direction, wherein the second extension is inserted between the upper cover and an annular protrusion part, which protrudes from a perimeter of the lower cover in a vertical direction.

5. The air cleaner according to claim 4, wherein the lower cover comprises:

a first support part, on which the control signal generator is seated;

the annular protrusion part protruding upright from an outer edge of the first support part;

a second support part extending outwards from an outer lower end of the annular protrusion part on a level plane with the first support part; and a third support part extending upright from an outer edge of the second support part, wherein the second extension of the extension part and an outer edge of the upper cover are inserted between the annular protrusion part and the third support part and are seated onto the second support part.

6. The air cleaner according to claim 5, wherein a drain hole for draining water is formed through the second support part.

7. The air cleaner according to claim 2, wherein the knob of the handle comprises:

a first knob housing extending a predetermined length in a vertical direction, the first knob housing having a cylindrical shape;

a second knob housing provided inside the first knob housing at a position spaced apart from the first knob housing by a predetermined distance, the second knob housing vertically extending a length shorter than the length of the first knob housing; and a third knob housing extending downwards from a lower end of the second knob housing towards a center of the control signal generator at a predetermined inclination angle.

8. The air cleaner according to claim 7, wherein the third knob housing reflects light, emitted from the luminous unit provided in the control signal generator, and transmits the light to outside the handle.

9. The air cleaner according to claim 2, wherein a click protrusion is provided on an inner surface of the upper cover, and a click dial is formed on an outer surface of the extension part, the click dial engaging with the click protrusion.

10. The air cleaner according to claim 1, wherein when the user pushes the rotary manipulation unit in a direction from the second position to the first position, the lift unit moves the rotary manipulation unit from the second position to the first position or from the first position to the second position using a cam mechanism.

11. The air cleaner according to claim 1, wherein the lift unit comprises:

an actuating bar coupled at a first end thereof to the rotary manipulation unit, with a cam guide protruding from one surface of the actuating bar;

an elastic member coupled to a second end of the actuating bar;

a cam shaft seated into the cam guide, the cam shaft being movable in a lateral direction; and a cam housing having a guide slot for receiving the cam shaft, the cam housing supporting the actuating bar and the elastic member therein, such that the actuating bar is movable upwards or downwards.

12. The air cleaner according to claim 1, wherein the rotary manipulation unit comprises:

a handle, having a knob and an extension part extending from a lower end of the knob in a circumferential direction;

an upper cover for supporting the extension part of the handle to prevent the handle from being removed from a correct position thereof;

a lower cover for covering a lower surface of the upper cover; and a control signal generator mounted to the lower cover to generate various control signals corresponding to the rotation of the handle for controlling the air cleaner.

13. The air cleaner according to claim 12, wherein the control signal generator comprises:

an encoder mounted to a PCB and connected to a rotating center of the handle to generate different control signals depending on angles at which the handle is rotated to; and at least one luminous unit to generate various colors of light.

14. The air cleaner according to claim 12, wherein the extension part of the handle comprises:

a first extension extending outwards from an outer surface of the knob in a horizontal direction; and a second extension extending from an outer edge of the first extension in a vertical direction, wherein the second extension is inserted between the upper cover and an annular protrusion part, which protrudes from a perimeter of the lower cover in a vertical direction.

15. The air cleaner according to claim 14, wherein the lower cover comprises:

a first support part, on which the control signal generator is seated;

the annular protrusion part protruding upright from an outer edge of the first support part;

a second support part extending outwards from an outer lower end of the annular protrusion part on a level plane with the first support part; and a third support part extending upright from an outer edge of the second support part, wherein the second extension of the extension part and an outer edge of the upper cover are inserted between the annular protrusion part and the third support part and are seated onto the second support part.

16. The air cleaner according to claim 15, wherein a drain hole for draining water is formed through the second support part.

17. The air cleaner according to claim 12, wherein the knob of the handle comprises:

a first knob housing extending a predetermined length in a vertical direction, the first knob housing having a cylindrical shape;

a second knob housing provided inside the first knob housing at a position spaced apart from the first knob housing by a predetermined distance, the second knob housing vertically extending a length shorter than the length of the first knob housing; and a third knob housing extending downwards from a lower end of the second knob housing towards a center of the control signal generator at a predetermined inclination angle.

18. The air cleaner according to claim 17, wherein the third knob housing reflects light, emitted from the luminous unit provided in the control signal generator, and transmits the light to outside the handle.

19. The air cleaner according to claim 12, wherein a click protrusion is provided on an inner surface of the upper cover, and a click dial is formed on an outer surface of the extension part, the click dial engaging with the click protrusion.

* * * * *

UNITED STATES PATENT AND TRADEMARK OFFICE

CERTIFICATE OF CORRECTION

PATENT NO. : 8,551,234 B2
APPLICATION NO. : 12/672543
DATED : October 8, 2013
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this
Fifteenth Day of September, 2015

Michelle K. Lee

Michelle K. Lee
*Director of the United States Patent and Trademark Office*